(12) United States Patent
Clement, Jr. et al.

(10) Patent No.: US 6,176,500 B1
(45) Date of Patent: Jan. 23, 2001

(54) TRANSPORTABLE CAR WASHING SYSTEM

(76) Inventors: Edward J. Clement, Jr.; Constance E. Clement, both of 373 Windrush Loop, Tarpon Springs, FL (US) 34689

( * ) Notice: Under 35 U.S.C. 154(b), the term of this patent shall be extended for 0 days.

(21) Appl. No.: 09/303,705

(22) Filed: May 3, 1999

(51) Int. Cl.[7] .................................................... B62B 3/00
(52) U.S. Cl. ...................................... 280/79.5; 280/47.34
(58) Field of Search ............................ 280/47.34, 47.35, 280/79.11, 79.2, 79.5; 248/129

(56) References Cited

U.S. PATENT DOCUMENTS

| | | | |
|---|---|---|---|
| 4,775,007 | * | 10/1988 | Mount ................................. 280/79.5 |
| 4,795,179 | * | 1/1989 | Liner ................................. 280/47.35 |
| 5,183,280 | * | 2/1993 | Gresch ............................... 280/79.5 |
| 5,806,867 | * | 9/1998 | Hampton ........................... 280/79.5 |

FOREIGN PATENT DOCUMENTS

835426 * 5/1960 (GB) ............................... 280/47.35

* cited by examiner

Primary Examiner—Richard M. Camby

(57) ABSTRACT

Disclosed is a transportable caddy for use in storing a number of products commonly used in washing a vehicle. The caddy includes a circular support which is adapted to removably and securely support a bucket. The entire caddy is supported by four legs. Each leg has a roller upon its lower extent, the roller allowing the entire caddy to be easily transported. Furthermore, the legs support drawers which allow for the storage of various cleaning products.

6 Claims, 3 Drawing Sheets

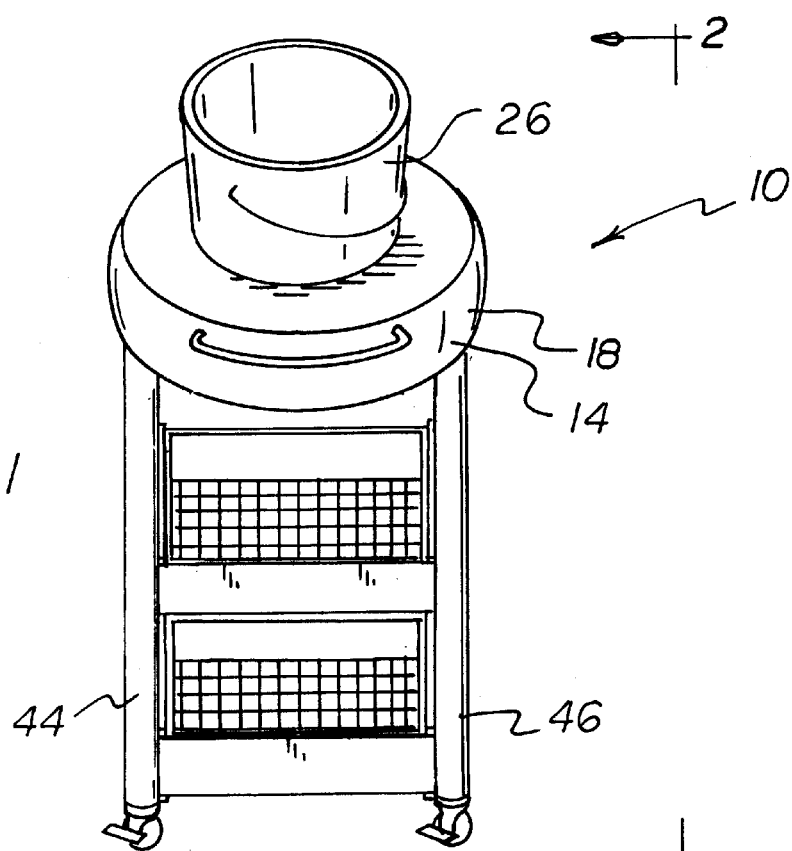
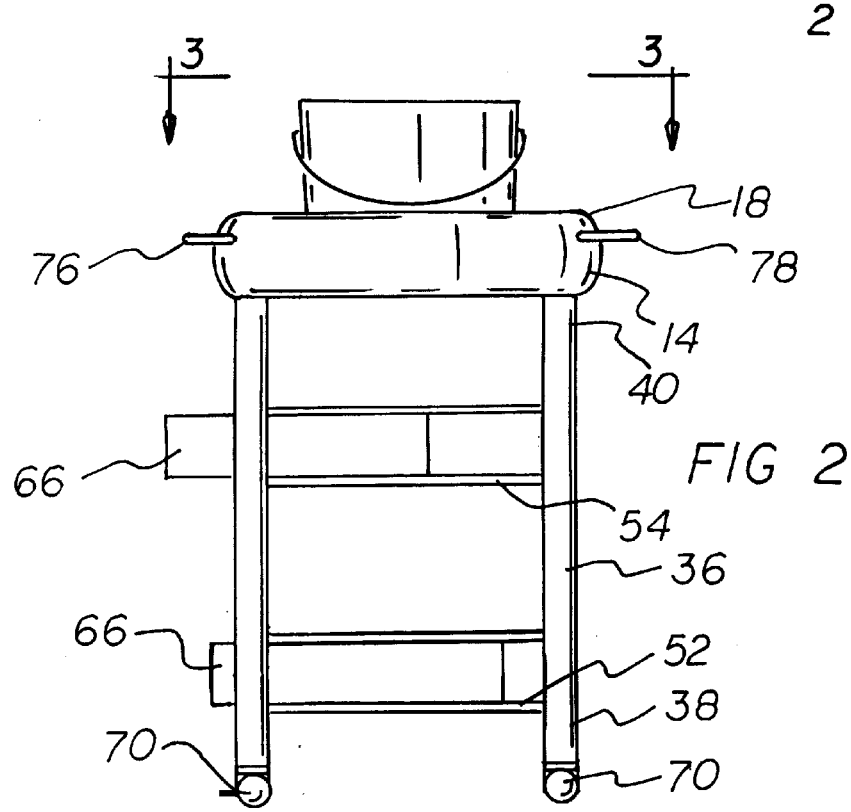

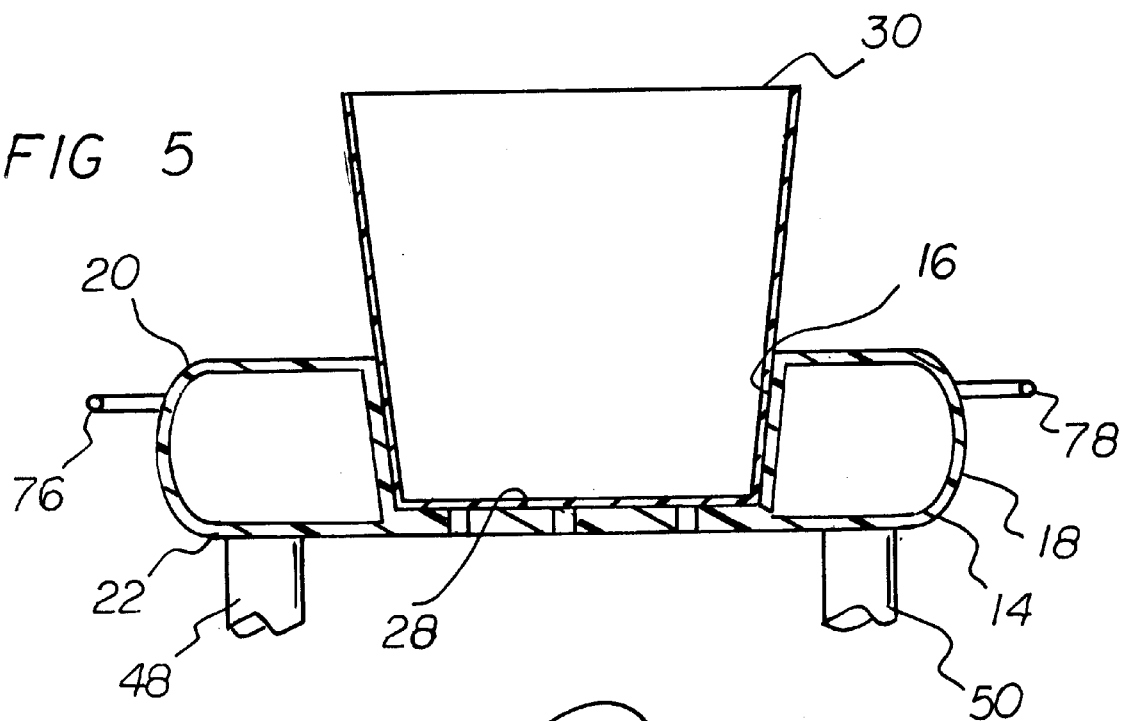
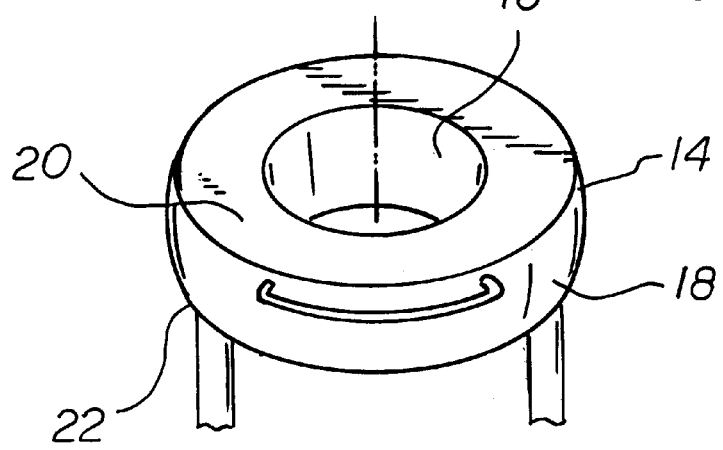

TRANSPORTABLE CAR WASHING SYSTEM

BACKGROUND OF THE INVENTION

1. Field of the Invention

The present invention relates to a new and improved car caddy and more particularly pertains to a device for removably supporting objects to be used in association with the washing of cars, trucks, boats, and other vehicles.

2. Description of the Prior Art

The use of caddy supports and like devices is known in the prior art. More specifically, caddy supports and like devices of known designs and configurations heretofore devised and utilized for the purpose of supporting objects when performing tasks are known to consist basically of familiar, expected, and obvious structural configurations.

By way of example, U.S. Pat. No. 3,573,879 to Bergkamp discloses a cart for storing and transporting cleaning implements. U.S. Pat. No. 5,305,481 to Nebb discloses a mobile work station in the form of a cart. U.S. Pat. No. 5,456,357 to Wenner et a. discloses a nestable bucket which serves as a carrier. U.S. Pat. No. 5,333,823 to Joseph discloses a detachable device holding apparatus which can be attached to a stepladder. Lastly, U.S. Pat. No. 4,917,124 to Ressar discloses a Bar-B-Q rack cleaning apparatus.

While these devices fulfill their respective, particular objectives and requirements, the aforementioned patents do not describe a new and improved car caddy as disclosed herein.

In this respect, the new and improved car caddy according to the present invention substantially departs from the conventional concepts and designs of the prior art, and in doing so provides an apparatus primarily developed for the purpose of removably supporting objects to be used in association with the washing of cars, trucks, boats, and other vehicles.

Therefore, it can be appreciated that there exists a continuing need for improved car caddy systems which can be used for removably supporting objects to be used in association with the washing of cars, trucks, boats, and other vehicles. In this regard, the present invention substantially fulfills this need.

SUMMARY OF THE INVENTION

In view of the foregoing disadvantages inherent in the known types of caddy supports, the present invention provides an improved car caddy system. As such, the general purpose of the present invention, which will be described subsequently in greater detail, is to provide an improved car caddy system which is specifically designed to hold and support vehicle cleaning implements.

To attain this, the present system essentially comprises a torus shaped bucket support having a maximum exterior diameter of about 18 inches and a maximum inside diameter of about 12 inches with an interior surface and an exterior surface. An upper surface and a lower surface are adapted to removably receive therewithin a bucket having a frusto-conical side wall, a closed bottom, an open top, and a pivotable handle. Further comprised in the system are four downwardly extending legs having lower ends and upper ends coupled to the lower surface of the support. The four legs provide two front legs and two rear legs, in essentially parallel relationship. The legs are about 36 inches in length. Further comprised in the system are pairs of channels coupling the legs parallel with respect to each other secured to the facing interior surface of the legs from front to rear, the channels having vertical exterior faces and short upper and lower edges. One pair of channels being located adjacent to the bottoms of the legs and the second pair of channels being located adjacent at intermediate extents thereof. Also included is a pair of drawers slidably received within the channels for the receipt of objects used in association with cleaning. Casters are located at the bottom of each of the legs with associated locks to secure the casters in a fixed orientation when in a first orientation and adapted to allow the location of the casters and movement of the legs and support when in a second orientation. A pair of handles are provided in a generally U-shaped orientation and with free ends secured to the front and rear surfaces of the support in a common horizontal plane.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the concept, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a caddy which efficiently and conveniently stores a wide variety of cleaning implements.

It is another object of the present invention to provide a caddy system which is designed to removably support a bucket of water in a stable and upright orientation.

If is a further object of the present invention to provide a storage means which includes drainage apertures such that no washing fluid is retained within the device.

An even further object of the present invention is to provide a car caddy system with casters to allow for the transport of the system.

Even still another object of the present invention is to provide a caddy system with lockable casters so that the system can be maintained in one location.

Lastly, it is an object of the present invention to provide a new and improved car caddy including a torus shaped bucket support with an interior surface and an exterior surface, an upper surface and a lower surface adapted to removably receive therewithin a bucket. The bucket has a frusto-conical side wall, a closed bottom, an open top and a pivotable handle. A plurality of downwardly extending legs having lower ends and upper ends are coupled to the lower surface of the support. Two front legs and two rear legs are included in essentially parallel relationship. Casters are located at the bottom of each of the legs with associated locks to secure the casters in a fixed orientation when in a first orientation and adapted to allow the location of the casters and movement of the legs and support when in a second orientation. A pair of handles are provided in a generally U-shaped orientation and free ends are secured to the front and rear surfaces of the support in a common horizontal plane. A pair of handles are provided in a generally U-shaped orientation and free ends are secured to the front and rear surfaces of the support in a common horizontal plane.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the new and improved car caddy constructed in accordance with the principles of the present invention.

FIG. 2 is a side elevational view of the device shown in FIG. 1.

FIG. 5 is a cross-sectional view taken along line 5—5 of FIG. 3.

FIG. 6 is an exploded perspective view of the bucket being removed from its support.

The same reference numerals refer to the same parts through the various Figures.

DESCRIPTION OF THE PREFERRED EMBODIMENT

Figure 3:
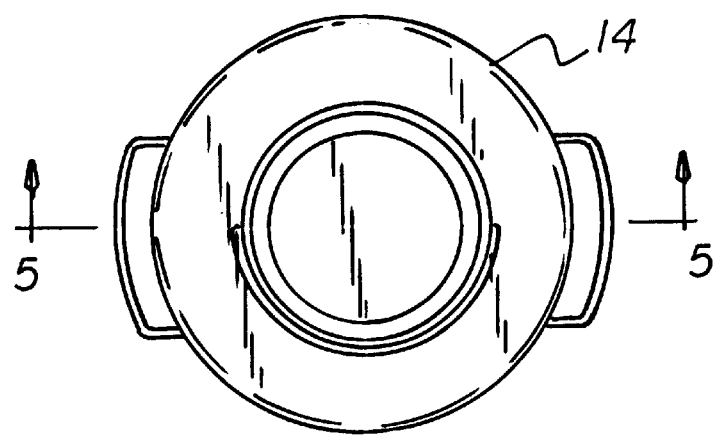
FIG. 3 is a top elevational view taken along line 3—3 of FIG. 2.
Figure 4:
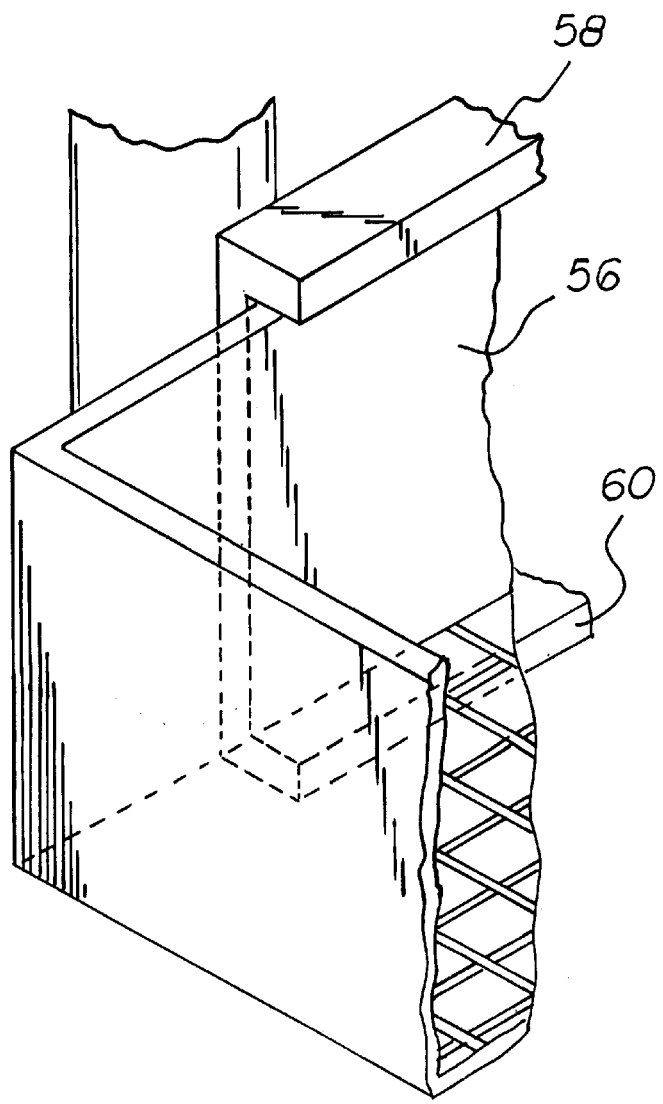
FIG. 4 is an enlarged perspective view of a portion of the drawer partially pulled-out.

With reference now to the drawings, and in particular to FIG. 1 thereof, the preferred embodiment of the car caddy of the present invention is depicted. Such car caddy is specifically designed to enable a user to easily access a number of different cleaning products. Its components include a bucket support, legs, channels, drawers, caster, and handles. The details of these components, and the manner in which they interrelate, will be described in greater detail hereinafter.

The caddy system 10 of the present invention is designed to removably support various objects used in association with the washing of cars, trucks, boats, and other vehicles. The major component of the system is the torus shaped bucket support 14. This support, in the preferred embodiment, has a maximum exterior diameter of about 18 inches and a maximum inside diameter of about 12 inches. It has been found that these dimensions enable the caddy to support most buckets of conventional design. Furthermore, the bucket support is defined by an interior surface 16, an exterior surface 18, an upper surface 20 and a lower surface 22. The upper surface and lower surfaces (20 and 22) are adapted to removably receive therewithin a bucket 24. Typically, such bucket has a frusto-conical side wall 26, a closed bottom 28, an open top 30 and a pivotable handle 32. The caddy is specifically dimensioned and designed such that when the bucket is positioned within the support 14, the bucket is prevented from tipping over or sliding off the remainder of the caddy. Additionally, the bucket is stored in a manner which allows it to be easily removed such that it can be filled with water or other cleaning fluids. The support 14 also includes a lower floor. In the preferred embodiment, drainage apertures are formed within the floor. These drainage apertures ensure that cleaning fluids do not accumulate within the support 14.

In an alternative embodiment, storage of cleaning products is facilitated by torus shaped compartments formed within a periphery of the torus shaped bucket support 14. The compartments are defined by a depth and a width. A number of separators are positioned within the depth of the compartment for use in dividing the compartment into smaller subcompartments. Each of these subcompartments is for use in the storage of cleaning products. However, as illustrated in FIG. 1, the preferred embodiment is to include no such compartments.

As illustrated in FIGS. 1 and 2, the bucket and bucket support are both positioned upon four downwardly extending legs. These downwardly extending legs 36 are defined by lower ends 38 and upper ends 40 which are coupled to the lower surface of the support 14. The four legs provide two front legs 44, 46 and two rear legs 48, 50 which are in essentially parallel relationship. In the preferred embodiment, the legs are about 36 inches in length to enable a user of average height in washing a vehicle. With reference to FIG. 5, the relationship between the legs and support 14 is depicted. Namely, the legs join the support at its outer periphery. Thus, the axis of the legs do not intersect the side wall of the bucket. This arrangement provides for increased stability.

With reference again to FIGS. 1 and 2, pairs of channels 52, 54 are employed in coupling the legs of the caddy. Such channels are parallel with respect to each other and secured to the facing interior surface of the legs. From front to rear the channels each have vertical exterior faces 56 and short upper and lower edges 58, 60. One pair of channels 52 are located adjacent to the bottoms of the legs, while the second pair of channels 54 are adjacently located at the intermediate extent of the legs.

Each set of channels is dimensioned to receive a sliding drawer. The pair of drawers 66 are slidably received within the channels for the receipt of objects used in association with cleaning. These drawers include grated lower surfaces to allow for the drainage of cleaning fluids. Although not depicted, the drawers could employ bearings or wheels to facilitate the sliding movement upon the adjacent channels. Furthermore, although the drawers are indicated as being opened topped in the drawings, they could readily be enclosed.

FIGS. 1 and 2 also illustrate the casters 70 and rollers which are located at the bottom of each of the legs. These casters 70 include associated locks to secure the casters in a fixed orientation. The locks have a first orientation wherein the casters are permitted to freely rotate, and a second orientation wherein the casters are fixed. Thus, with the locks in the first orientation the caddy is allowed to freely move.

Turning now to FIG. 3, the pair of handles 76, 78 associated with the caddy are depicted. Such handles are provided in a generally U-shaped orientation and with free ends 80 secured to the front and rear surfaces of the support in a common horizontal plane. The handles can be employed in towing the caddy. Alternatively, each of the handles can be employed as a towel rack.

Thus, in use, the caster locks of each of the four legs is moved to the unlocked orientation. The caddy can then be maneuvered, preferably by handles 76 and 78, and positioned adjacent a vehicle to be washed. Then, the casters are locked to fix the caddy in the desired location. Thereafter, a bucket can be filled with water and detergents and removably placed within support 14. Other cleaning supplies can be stored within the drawers 66.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved car caddy system for removably supporting objects used in association with the washing of cars, trucks, boats, and other vehicles comprising, in combination:

a torus shaped bucket support having a maximum exterior diameter of about 18 inches and a maximum inside diameter of about 12 inches with an interior surface and an exterior surface, an upper surface and a lower surface adapted to removably receive therewithin a bucket having a fustro-conical side wall, a closed bottom, an open top and a pivotable handle, the bucket support having a lower floor with drainage apertures formed therein;

four downwardly extending legs having lower ends and upper ends coupled to the lower surface of the support, the four legs providing two front legs and two rear legs in essentially parallel relationship, the legs being about 36 inches in length, each of the legs are coupled to an outer periphery of the bucket support, each of the legs serving to define a leg axis, the leg axes being such that they do not intersect the frusto-conical side wall of the bucket;

pairs of channels coupling the legs parallel with respect to each other secured to the facing interior surface of the legs from front to rear the channels having vertical exterior faces and short upper and lower edges, one pair of channels being located adjacent to the bottoms of the legs and the second pair of channels being located adjacent at intermediate extents thereof;

drawers with grated lower surfaces are slidably received within the channels for the receipt of objects used in association with cleaning;

casters located at the bottom of each of the legs with associated locks to secure the casters in a fixed orientation when in a first orientation and adapted to allow the location of the casters and movement of the legs and support when in a second orientation;

a pair of handles in a generally U-shaped orientation and having free ends secured to the front and rear surfaces of the support in a common horizontal plane.

2. A car caddy system comprising:

a bucket having a frusto-conical sidewall, a closed, imperforate bottom wall, and an open top and with a pivotable handle secured to the sidewall of the bucket adjacent to the top;

a torus shaped bucket support with an interior surface and an exterior surface, an upper surface and a lower surface adapted to removably receive therewithin the bucket;

casters located at the bottom of each of the legs with associated locks to secure the casters in a fixed orientation when in a first orientation and adapted to allow the location of the casters and movement of the legs and support when in a second orientation; and a pair of handles in a generally U-shaped orientation and having free ends secured to the front and rear surfaces of the support in a common horizontal plane.

3. The system as set forth in claim 2 and further comprising at least one pair of channels coupling the legs parallel with respect to each other secured to the facing interior surface of the legs from front to rear the channels having vertical exterior faces and short upper and lower edges, one pair of channels being located adjacent to the bottoms of the legs and the second pair of channels being located adjacent at intermediate extents thereof; and drawers slidably received within the channels for the receipt of objects used in association with cleaning.

4. The system as set forth in claim 2 and wherein each of the legs are coupled to an outer periphery of the bucket support, each of the legs serving to define a leg axis, the leg axes being such that they do not intersect the frusto-conical side wall of the bucket.

5. The system as set forth in claim 3 wherein the drawers each include grated lower surfaces to enable the draining of cleaning fluids.

6. The system as set forth in claim 2 wherein the bucket support has a lower floor with drainage apertures formed therein.

* * * * *